US006562441B1

(12) United States Patent
Maeda et al.

(10) Patent No.: US 6,562,441 B1
(45) Date of Patent: May 13, 2003

(54) INK JET RECORDING MEDIUM

(75) Inventors: Masayo Maeda, Kawasaki (JP); Kozo Tajiri, Tokyo (JP)

(73) Assignee: Oji Paper Co., Ltd., Tokyo (JP)

( * ) Notice: Subject to any disclaimer, the term of this patent is extended or adjusted under 35 U.S.C. 154(b) by 12 days.

(21) Appl. No.: 09/711,534

(22) Filed: Nov. 14, 2000

(30) Foreign Application Priority Data

Nov. 19, 1999 (JP) .......................................... 11-329158
Sep. 12, 2000 (JP) ...................................... 2000-276146

(51) Int. Cl.$^7$ ............................................... B32B 27/14
(52) U.S. Cl. ....................... 428/195; 428/323; 428/329; 428/331; 428/422
(58) Field of Search ................................ 428/195, 323, 428/328, 331, 212, 220, 329, 422, 500

(56) References Cited

U.S. PATENT DOCUMENTS

| | | | | | |
|---|---|---|---|---|---|
| 5,612,281 | A | * | 3/1997 | Kobayashi et al. | 503/227 |
| 5,958,168 | A | * | 9/1999 | Liu et al. | 156/230 |
| 5,965,252 | A | * | 10/1999 | Santo et al. | 428/329 |
| 6,146,712 | A | | 11/2000 | Maeda et al. | |

FOREIGN PATENT DOCUMENTS

| | | | | |
|---|---|---|---|---|
| EP | 0 492 887 | | 7/1992 | |
| EP | 0 650 850 | | 5/1995 | |
| EP | 0 671 282 | | 9/1995 | |
| EP | 0 803 374 | | 10/1997 | |
| EP | 919395 | * | 6/1999 | B41M/5/00 |
| EP | 0 919 395 A2 | | 6/1999 | |
| GB | 2 078 236 | | 1/1982 | |
| JP | 62-221591 | | 9/1987 | |
| JP | 6-155895 | | 6/1994 | |
| JP | 8-267905 | | 10/1996 | |
| JP | 9-263038 | | 10/1997 | |
| JP | 11-11003 | | 1/1999 | |
| JP | 11-157202 | | 6/1999 | |

OTHER PUBLICATIONS

Grant & Hackh's Chemical Dictionary McGraw Hill Book Co., 5$^{th}$ ed. (1987)), p 145.*

* cited by examiner

*Primary Examiner*—Bruce H. Hess
*Assistant Examiner*—Michael Grendzynski
(74) *Attorney, Agent, or Firm*—Oblon, Spivak, McClelland, Maier & Neustadt, P.C.

(57) ABSTRACT

A high-performance ink jet recording medium containing a pigment is provided, which has a crack-free, porous ink-receiving layer, and also excellent gloss, transparency and water resistance, and which provides high image quality and ink-drying property.

The ink jet recording medium has at least one coating layer on the base material. At least one of the layers comprises a porous ink-receiving layer formed by applying an aqueous coating material comprising (a) 100 parts by weight of a fine pigment having an average particle diameter of not larger than 1 μm and a pore volume of 0.4 to 2.5 ml/g and (b) 1 to 100 parts by weight of a hydrophilic resin free of radical-polymerizable unsaturated bond and capable of forming a hydrogel by the irradiation of an aqueous solution thereof with electron beam, then irradiating the coating material with electron beam to convert it into a hydro-gel and drying the layer.

19 Claims, No Drawings

INK JET RECORDING MEDIUM

BACKGROUND OF THE INVENTION

The present invention relates to an ink jet recording medium having an ink-receiving layer mainly comprising a pigment. In particular, the present invention relates to a high-performance ink jet recording medium excellent in gloss, transparency and water resistance and capable of providing a high image quality and ink drying property.

Various output systems of computers, such as wire-dot printing system, thermal recording system, ink melting heat transfer printing system, sublimation heat transfer printing system, electrophotographic system and ink jet printing system, were developed. Among them, the ink jet printing system is recognized to be suitable for personal use because plain paper is usable as the printing sheet, the running cost is low and the hardware is compact and inexpensive. Further, since full color system and high resolution were attained recently, the ink jet printing system attracts attention as an easy means of the output of color images, and printers of this system are rapidly increasing in number on the market.

The basic properties required of the ink jet recording medium used for the output of the ink jet printers are as follows: It rapidly absorbs an ink comprising water, a dye, an organic solvent, additives, etc. to reproduce fine letters or image; the color density of the image is high; and the tone is uniform. To satisfy these requirements, many high-performance ink jet printing media comprise a special ink-receiving layer on a base material. Such ink-receiving layers are roughly divided into two groups, i.e., a resin receiving layer and a pigment receiving layer. The ink-receiving resin layer is usually prepared by applying an aqueous solution of a water-soluble resin such as polyvinyl alcohol, polyvinylpyrrolidone, a water-soluble cellulose derivative or gelatin to a base material sheet and drying it. The preparation cost is relatively low, and the preparation is relatively easy. The resin ink-receiving layer is often used also for ink jet recording medium for over-head projectors (hereinafter referred to as "OHP") which medium necessitates a high transmittance, taking advantage of a high transparency thereof. Another advantage of the resin ink-receiving layer is that the ink absorption per a unit weight thereof is higher than that of the pigment ink-receiving layer.

However, various properties are required of the ink jet recording media such as ink-drying properties, water resistance of the printed matter, resistance of the image to the deterioration even after leaving it indoors or outdoors for a long period of time and freeness from blocking even after the storage of them piled up, in addition of the above-described high image quality. The resin ink-receiving layer was inferior to the pigment ink-receiving layer particularly in the ink-drying property and water resistance. Therefore, it has been said that the improvement in these properties of the former is necessary. An ordinary method tried for improving the quality was to cross-link a water-soluble resin in the ink-receiving layer with a crosslinking agent or to mix a hydrophobic resin therein to impart the water resistance to the layer. However, when a sufficient water resistance was tried to be imparted to the layer by using any possible crosslinking agent or hydrophobic resin, the ink-absorption of the ink-receiving layer was seriously reduced. Thus, both image quality and water resistance could not be improved at the same time.

Under these circumstances, the inventors proposed a resin ink-receiving layer prepared by applying an aqueous composition containing, as the main ingredient, a water-soluble resin free of radical-polymerizable unsaturated bond and capable of forming a hydro-gel by electron beam irradiation to a base material sheet and irradiating electron beam to form a hydrogel and then drying the sheet [Japanese Patent Unexamined Published Application (hereinafter referred to as "J. P. KOKAI") No. Hei 11-157202 corresponding to EP919395A]. Water resistance could be thus imparted to the above-described resin ink-receiving layer without seriously deteriorating the image quality unlike the non-crosslinked ink-receiving layer which was not irradiated with electron beam. However, the ink-absorption velocity of the ink-receiving resin layer is limited because it is not porous and as for the ink-absorption mechanism, it absorbs the ink by swelling. Thus, a further improvement is necessitated for obtaining both satisfactory image quality and ink-drying time with the latest ink jet printer which jets a large quantity of inks. Although the water resistance of the ink-receiving resin layer is on a very high level as compared with other similar products, it is yet lower than that of the high-performance pigment ink-receiving layer.

J. P. KOKAI Nos. Hei 8-207423 and Hei 8-267905 disclose ink jet printing sheets having a surface layer cured by the irradiation with electron beam and containing a water-soluble polyalkylene oxide and colloidal silica. However, in this ink-receiving layer, a pigment is only dispersed in the resin but it is not porous. Therefore, the ink is absorbed only by the swelling of the layer like ink-receiving layers comprising only a resin.

On the other hand, a pigment ink-receiving layer prepared by fixing a pigment with a binder resin is capable of rapidly receiving an ink by the capillarity in the pores formed within and outside the pigment particles. Thus, the image quality and ink-drying property of this layer more excellent than those of the resin ink-receiving layer, which absorbs the ink by the dissolution and swelling, can be easily obtained. Further, a very high water resistance of the pigment ink-receiving layer can be obtained when the binder resin is resistant to water. However, for obtaining an image of a high quality, it is necessary to secure a pore volume sufficient for the jetted ink in the layer. Thus, a very large amount of the coating must be applied in order to correspond to the high-performance ink jet printer which jets a large amount of inks.

A pigment ink-receiving layer is prepared at present by dispersing a synthetic, amorphous silica in the form of a powder having an average particle diameter of 1 to 20 $\mu$m in water, mixing a water-resistant binder resin and additives in the resultant dispersion, and applying the resultant mixture to a base material. Although such a pigment ink-receiving layer has a high water resistance and ink absorption, the transparency of the ink-receiving layer is low because the average particle diameter of the pigment is large. Such a low transparency of the ink-receiving layer is unsuitable for the preparation of a transmittant recording medium with a transparent base material and, in addition, the printing density of the image is low even when an opaque base material is used. In addition, because the synthetic amorphous silica used therein has a large and ununiform particle diameter, the gloss of the ink-receiving layer is low and such a layer is unsuitable for the preparation of a gloss ink jet recording medium.

Taking the above-described points into consideration, it is necessary, for obtaining a high gloss and ink absorption of the ink-receiving layer, that a fine pigment having a large pore volume and a small and uniform average particle diameter is used for the preparation of a high-quality ink jet recording medium. Pigments in the form of fine particles such as silica, aluminum hydroxide, boehmite, pseudo-boehmite and alumina are suitably used. However, because such a fine pigment has a large pore volume and small pore diameter, the shrinkage by the capillary power, which is caused in the course of the drying after the application, is serious, and the resultant coating layer is very easily cracked. After the investigations, the inventors found that the cracking of the ink-receiving layer and the lowering of the gloss and transparency caused by the cracking can be prevented by mixing a completely saponified polyvinyl alcohol having a high degree of polymerization and a high binding power and capable of being crystallized to realize the water resistance after drying; dividing the obtained mixture in small portions; and applying the portions of the mixture to form multiple layers so as to reduce shrinkage force per one layer when drying.

However, such a multilayer coating has a low preparation efficiency and also needs a caution for not impairing spaces formed in the lower layer in the formation of the second and further layers. Another defect of the multilayer coating is that problems such as that the formation of bubbles easily occurs. Therefore, it is desirable to apply a necessitated amount of the coating by one step. However, when the amount of the binder resin is simply increased for the purpose of preventing the cracking, the pores formed by the fine pigment are filled up with the resin to exert a bad influence on the ink absorption.

J. P. KOKAI No. Hei 7-76161 proposes a method of preventing the formation of microcracks responsible for the cracking, by adding polyvinyl alcohol and boric acid or a borate to a fine pigment dispersion so as to gel the coating during the drying. It is considered that the gelation of the coating during drying increases the power of the binder and is effective for the prevention of the cracking. However, this process has a problem of the stability in the coating liquid.

Another method of gelling the coating prior to the drying is a sol application method described in J. P. KOKAI No. Hei 6-218324 wherein after the application of a dispersion of a fine pigment stabilized with a peptizer such as an acid or alkali, it is exposed to an alkaline or acidic gas to remove the peptizer. Although the effect of preventing the cracking can be expected to some extent, this technique still has problems in practice in that the practice of the technique is disturbed, because a gas of a high concentration is necessary to be used in the step of preparing the ink-receiving layer, a smell still remains in the coating layer after the drying and the final pH is on the very acidic side or very alkaline side.

J. P. KOKAI No. Hei 9-263038 discloses a method of gelling a coating prior to the drying by applying a coating liquid comprising an inorganic sol and an ionizing radiation-curing compound, irradiating the ionizing radiation to cure this compound and then drying the coating layer to form an ink-receiving layer. However, when the inventors tried this method, the gel having a sufficient strength could not be obtained and when a fine pigment having a large pore volume and a high ink-absorbing capacity was used, the ink-receiving layer was cracked in the course of the drying. In addition, many of the ionizing radiation-curing compounds have a relatively low molecular weight and a strong skin-irritating property and, therefore, it is feared that the uncured components will exhibit a bad influence on the print quality and also on the safety. Further, because most ionizing radiation-curable compounds now available on the market have a low hydrophilic property, they are unsuitable for the aqueous coating technique usually employed for forming the ink-receiving layer for the ink jet system. As a result, the materials must be selected in an extremely narrow range.

On the other hand, when an ordinary technique, i.e., the gelation with a chemical crosslinking agent, was tried, the gelation velocity was lower than the velocity of drying the coating, because considerable heat and time are necessitated for the chemical crosslinking. As a result, the cracking is caused before the gelation proceeds.

SUMMARY OF THE INVENTION

The object of the present invention is to provide a high-performance ink jet recording medium, which has a crack-free, porous ink-receiving layer containing a pigment, and also excellent gloss, transparency and water resistance, and which provides high image quality and ink-drying property.

Another object of the present invention is to provide a high-performance ink jet recording medium, which is free from the cracking, even when a fine pigment which causes the easy cracking is used and a large amount of a coating material is applied for forming the ink-receiving layer.

To attain the above-described objects, the present invention as been constructed as follows.

Specifically, according to the first feature of the invention, there is provided an ink jet recording medium having at least one coating layer on a base material, wherein at least one of the coating layers comprises a porous ink-receiving layer formed by applying an aqueous coating comprising (a) 100 parts by weight of a fine pigment having an average particle diameter of not larger than 1 $\mu$m and a pore volume of 0.4 to 2.5 ml/g and (b) 1 to 100 parts by weight of a hydrophilic resin free of radical-polymerizable unsaturated bond and capable of forming a hydrogel by the irradiation of an aqueous solution thereof with electron beam, irradiating the resultant coating with electron beam to convert it into a hydro-gel and then drying the layer.

According to the second feature of the invention, there is provided an ink jet recording medium having at least one coating layer on a base material, wherein at least one of the coating layers comprises a porous ink-receiving layer having a pore volume of 0.2 to 2.0 ml/g, the coating being formed by applying an aqueous coating comprising (c) 100 parts by weight of a fine pigment having an average particle diameter of not larger than 1 $\mu$m and (d) 1 to 100 parts by weight of a hydrophilic resin free of radical-polymerizable unsaturated bond and capable of forming a hydrogel by the irradiation of an aqueous solution thereof with electron beam, irradiating the resultant coating with electron beam to convert it into a hydro-gel and then drying the layer.

According to the third feature of the invention, there is provided an ink jet recording medium according to the first and second features of the inventions, wherein the dry weight reduction rate of the ink-receiving layer after the immersion in water for one hour is not higher than 10%.

According to the fourth feature of the invention, there is provided an ink jet recording medium according to any of the first to third features of the inventions, wherein the hydrophilic resin free of radical-polymerizable unsaturated bond and capable of forming a hydrogel by the irradiation of an aqueous solution thereof with electron beam is at least one resin selected from the group comprising completely saponified or partially saponified polyvinyl alcohols, polyethylene oxide, polyalkylene oxides, polyvinylpyrrolidone, water-soluble polyvinylacetal, poly-N-vinylacetamide, polyacrylamide, polyacryloylmorpholine, polyhydroxyalkyl acrylates, polyacrylic acid, hydroxyethylcellulose, methylcellulose, hydroxypropylmethylcellulose, hydroxypropylcellulose, gelatin, casein, water-soluble derivatives of them and copolymers of them.

According to the fifth feature of the invention, there is provided an ink jet recording medium according to the fourth feature of the invention, wherein the hydrophilic resin free of radical-polymerizable unsaturated bond and capable of forming a hydrogel by the irradiation of an aqueous solution thereof with electron beam is a cationic derivative selected from the group consisting of cationic polyvinyl alcohol, cationic polyvinylpyrrolidone, cationic water-soluble polyvinyl acetal, cationic poly-N-vinylacetamide, cationic polyacrylamide, cationic polyacryloylmorpholine, cationic polyhydroxyalkyl acrylates, cationic hydroxyethylcellulose, cationic methylcellulose, cationic hydroxypropylmethylcellulose, cationic hydroxypropylcellulose, cationic gelatin and cationic casein.

According to the sixth feature of the invention, there is provided an ink jet recording medium according to any of the first to fifth features of the inventions, wherein the fine pigment is at least one pigment selected from the group consisting of silica, aluminum hydroxide, boehmite, pseudo-boehmite and alumina.

According to the seventh feature of the invention, there is provided an ink jet recording medium according to any of the first to sixth features of the inventions, wherein the fine pigment is in the form of secondary particles having an average diameter of 8 to 800 nm comprised of aggregated primary particles having an average diameter of 3 to 40 nm.

After intensive investigations made for the purpose of forming an ink-receiving layer by using a fine pigment usable as a starting material for an ink-receiving layer having excellent image quality and ink-drying property but easily cracked in the course of the drying, the inventors have confirmed that, to obtain an ink-receiving layer usable for the latest ink jet printers, which jet a large quantity of inks, and having a high gloss and a high transparency and free from the cracking by applying a large amount of a coating, the strength of the binder resin in the coating layer must be considerably increased. However, it was impossible to impart such a sufficient strength to the binder resin in the prior art.

The inventors have then found that when an aqueous coating prepared by mixing an ordinary, fine pigment with a completely saponified polyvinyl alcohol as a binder resin was applied in an amount of 25 $g/m^2$ (dry basis) to a base material and then it was immediately irradiated with electron beam, the binder resin was crosslinked and the whole coating layer was converted into a hydrogel of a high gel strength. When the resultant coating was further dried, a crack-free ink-receiving layer having a high gloss and a high transparency was obtained by the effect of the binder resin which had been converted into the high-molecular gel by the crosslinking. When the coating layer was used for the printing with an ink jet printer, an image of a high quality was obtained and, in addition, the ink-drying property was also excellent.

On the other hand, when it was tried to prepare the ink-receiving layer without electron beam irradiation for comparison, severe cracks were formed on the whole surface and the layer was unsuitable for the ink jet recording medium.

In another test wherein the effect of electron beam irradiation was examined under such a condition that the amount of the coating was small enough for forming the film without causing the cracking even without electron beam irradiation, the following fact was found: In the coating layer irradiated with electron beam, the coagulation of the fine pigment particles in the drying step was inhibited to give a higher gloss and transparency as compared with those of a coating layer obtained without electron beam irradiation. Another advantage found in the test was that because the binder resin is gelled before the drying to increase its strength, the migration of the binder resin in the course of the drying and the falling of the fine pigment powder from the surface of the ink-receiving layer are prevented and also water resistance of the coating layer is improved. In addition, it was confirmed that because the crosslinking of the binder resin by electron beam irradiation occurs not only in resins having a specified functional group, the effects of preventing the cracking and improving the gloss, transparency and water resistance can be obtained and also the high-performance ink jet recording medium having excellent image quality and ink drying property can be obtained even when various hydrophilic resins other than the completely saponified polyvinyl alcohol, which cause less cracking, are used as the binder resins. The present invention has been completed on the basis of this finding.

DESCRIPTION OF PREFERRED EMBODIMENTS

Fine pigment particles having an average diameter of not larger than 1 μm are used in the present invention. With such a pigment, an ink-receiving layer having an excellent ink-absorption and also an excellent transparency and gloss can be obtained. The average particle diameter herein indicates that determined by the dynamic light-scattering method (cumulant method). The varieties of the pigments are not particularly limited. Various pigments known in the fields of ordinary coated papers and ink jet printing papers and available on the market are usable. They include, for example, silica, aluminosilicates, kaolin, clay, calcined clay, zinc oxides, tin oxides, aluminum oxide, boehmite, pseudo-boehmite, alumina, calcium carbonate, satin white, aluminum silicate, smectites, magnesium silicate, magnesium carbonate, magnesium oxide, diatomaceous earth, styrene plastic pigments, urea resin plastic pigments and benzoguanamine plastic pigments. Among these fine pigments, silica, aluminum hydroxide, boehmite, pseudo-boehmite and alumina are preferred because of their high pore volume and ink absorption.

Silica is particularly preferred because its pore volume is the largest. Silica can be classified into wet method silica prepared from an alkali silicate and dry method silica obtained by decomposing a volatile silicon compound such as silicon tetrachloride in flames. They are both preferred. The preferred pore volume of silica is in the range of 0.4 to 2.1 ml/g.

On the other hand, a kind of silica generally called “colloidal silica” is prepared by treating an aqueous alkali silicate solution with an ion exchange resin to prepare an aqueous silicic acid solution, adding an alkali to the obtained solution to stabilize it, heating the solution to prepare discrete fine silica particles, and slowly adding the aqueous silicic acid solution to grow the fine silica particles. It is clear from the method of the preparation of the colloidal silica that the silica particles do not form the secondary particles. Therefore, the pore volume of these particles is in the range of 0.2 to 0.3 ml/g. These particles are unsuitable for the use for the ink-receiving layer because of a low ink absorption thereof.

To obtain an ink-receiving layer having a high gloss and a high transparency, fine pigment particles having an average diameter of not larger than 1 μm are used. The fine pigment particles are preferably secondary particles having an average diameter of 8 to 800 nm, wherein primary particles having an average diameter of 3 to 40 nm are aggregated. The diameter of the secondary particles is preferably 9 to 700 nm, particularly preferably 10 to 500 nm. These secondary particles have a high pore volume because they have spaces therein. Further, cavities between the secondary particles are effective for the ink absorption to increase the ink-absorbing capacity of the particles. Another advantage is that since the primary particles are small enough as compared with wavelength of the light, the light-scattering power thereof is lower than that of the secondary particle-free pigment and, therefore, a high transparency of the ink-receiving layer is obtained.

When the primary particle diameter and the secondary particle diameter are excessively small, it is difficult that the cavities which contribute to the ink absorption are formed and the ink absorption of the ink-receiving layer might be lowered. On the contrary, excessively large primary particle diameter and secondary particle diameter will reduce the transparency of the recording layer to make it difficult to obtain a high printing density. In addition, an excessively large diameter of the secondary particles causes the lowering of the gloss of the ink-receiving layer, roughening of the surface and falling off of the powder. The term "primary particle diameter of the pigment" herein indicates a particle diameter (Martin diameter) determined with an electronic microscope (SEM and TEM) [see p. 52 of "Biryushi Handbook (Fine Grain Handbook)" published by Asakura Book Store]. The secondary particle diameter is determined by a dynamic light-scattering method.

For obtaining an ink-receiving layer having a high ink-absorbing capacity, the higher the pore volume of the fine pigment, the better. The pore volume of the fine pigment suitable for use in the present invention is 0.4 to 2.5 ml/g, preferably 0.4 to 2.0 ml/g, more preferably 0.6 to 1.9 ml/g and most preferably 0.7 to 1.8 ml/g. The pore volume is determined by a specific surface area/pore distribution determination device based on gas adsorption method. The pore volume means that of the total pore volume of pores having a diameter of 100 nm or smaller.

The higher the pore volume of the fine pigment particles in the fine pigment ink-receiving layer, the higher the ink absorption of the coating layer in general. However, the shrinkage due to the capillary power, which is caused when dried after the coating, is also increased in such a case. Thus, the satisfactory film formation is made impossible by the cracking in an ordinary coating method. Therefore, it is difficult that such a technique is employed in practice. However, the ink jet recording medium of the present invention is free from such a defect in the film formation.

The method of preparing such fine pigment particles is not particularly limited. In one of the methods, commercially available pigment particles having a size of several $\mu$m are pulverized and dispersed by applying a strong force by a mechanical means. This method is called a breaking down method wherein a bulky starting material is divided into small particles. The mechanical means are, for example, ultrasonic homogenizer, compression homogenizer, namomizer, high-speed rotary mill, roller mill, vessel driving medium mill, medium stirring mill, jet mill and sand grinders. The resultant fine pigment may be in the form of either a colloid or a slurry. Another preferred method of preparing the fine pigment particles is a method disclosed in J. P. KOKAI Nos. Hei 5-32413 and 7-76161 wherein a metal alkoxide is hydrolyzed.

The hydrophilic resins free of radical-polymerizable unsaturated bond and capable of forming a hydrogel by the irradiation of an aqueous solution thereof with electron beam, which are another main ingredient of the aqueous coating material used in the present invention, are, for example, completely saponified polyvinyl alcohol, partially saponified polyvinyl alcohol, polyethylene oxide, polyalkylene oxides, polyvinylpyrrolidone, water-soluble polyvinylacetal, poly-N-vinylacetamide, polyacrylamide, polyacryloylmorpholine, polyhydroxyalkyl acrylates, polyacrylic acid, hydroxyethylcellulose, methylcellulose, hydroxypropylmethylcellulose, hydroxypropylcellulose, gelatin, casein and water-soluble derivatives of them, such as cationic derivatives thereof, as well as copolymers thereof. The water-soluble derivatives are, for example, cation modified products of them, anion modified products of them, derivatives of them obtained by the chemical modification such as esterification, etherification or amidation of a functional group such as hydroxyl group, carboxyl group or amino group thereof, and polymers in which another side chain was introduced by the graft polymerization. The copolymers are, for example, those comprising vinyl monomers such as those constituting polyvinyl alcohol, polyvinylpyrrolidone, water-soluble polyvinylacetal, poly-N-vinylacetamide, polyacrylamide, polyacryloylmorpholine, polyhydroxyethyl acrylate and polyacrylic acid; and copolymers comprising monomers other than those constituting these polymers. These hydrophilic resins are usable not only alone but also in the form of a mixture of two or more of them. Among these hydrophilic resins, polyvinyl alcohol is preferred because of a high miscibility thereof with the fine pigment.

The term "hydrogel" indicates a polymer having a three-dimensional network constitution, being swollen with a solvent mainly comprising water and having no flowability. Because electron beam crosslinking reaction in the present invention is initiated mainly by the pulling of hydrogen, non-specified functional group is crosslinked.

The optimum molecular weight of the specific hydrophilic resin of the present invention is not limited because the properties of the resin vary depending on the kind thereof. However, when the molecular weight of the resin is excessively high, the coating liquid obtained by mixing it with the fine pigment is easily gelled or even when the gelation does not occur, the resultant coating liquid is highly viscous and causes problems with the coating properties. On the contrary, when the molecular weight of the resin is excessively low, the gel strength of the hydrogel obtained by the irradiation with electron beam is insufficient to cause the cracking of the resultant coating layer after the drying and to make it impossible to obtain the complete effect of the present invention. Thus, the molecular weight of typical resins is preferably about 10,000 to 5,000,000 and more preferably 50,000 to 1,000,000.

Among the derivatives of the specific hydrophilic resins and copolymers thereof, particularly preferably are the water-soluble derivatives or hydrophilic resins selected from the group consisting of cationic completely saponified or partially saponified polyvinyl alcohol, cationic polyvinylpyrrolidone, cationic water-soluble polyvinyl acetal, cationic poly-N-vinylacetamide, cationic polyacrylamide, cationic polyacryloylmorpholine, cationic polyhydroxyalkyl acrylates, cationic hydroxyethylcellulose, cationic methylcellulose, cationic hydroxypropylmethylcellulose, cationic hydroxypropylcellulose, cationic gelatin and cationic casein.

Most of dyes and pigments used as the coloring ingredient in inks used for ink jet printers have an anionic group. Accordingly, a cationic ink fixing agent is suitably used for forming the ink-receiving layer. When the pigment used as the main ingredient is an anionic pigment such as silica, the use of such a cationic resin as the binder resin is recommended because it improves the water resistance of the printed image and an effect thereof on the prevention of the tone change with time due to the migration of the coloring substance and also the prevention of the bleeding of the image in the ink-receiving layer after the printing.

For the prevention of the tone change with time after the printing, it is effective to use a resin having a high affinity with the hydrophilic high-boiling point solvent contained in the ink. The resin is used either alone or in the form of a mixture thereof. The hydrophilic high-boiling point solvents contained in the ink are, for example, glycerol, ethylene glycol, diethylene glycol, triethylene glycol, polyethylene glycol, propylene glycol, dipropylene glycol, diethylene glycol monomethyl ether, 2-pyrrolidone, thiodiglycol, triethylene glycol monobutyl ether and 1,5-pentanediol. Resins having a high affinity with these solvents include polyvinylpyrrolidone, polyacryloylmorpholine, polyhydroxyalkyl acrylates and hydroxypropylcellulose. The resins are, however, not limited to them.

As for the relative amounts of the fine pigment having an average particle diameter of not larger than 1 μm and used as the main ingredient of the ink-receiving layer and the hydrophilic resin capable of forming the hydrogel by the irradiation of an aqueous solution thereof with electron beam in the mixture, the amount of the former is 100 parts by weight and that of the latter is 1 to 100 parts by weight. Because an image is formed mainly by receiving an ink in the pores formed inside and outside of the fine particles in the ink jet recording medium of the present invention, it is desirable from the viewpoint of the ink absorption that the amount of the hydrophilic resin is as small as possible. Since the hydrophilic resin increases the apparent particle diameter of the fine pigment in the ink-receiving layer, the amount of the hydrophilic resin is desirably as small as possible so far as the cracking is not caused, from the viewpoint of the transparency of the layer. For the reasons described above, the amount of the hydrophilic resin is preferably 3 to 30 parts by weight, most preferably 5 to 25 parts by weight, for 100 parts by weight of the fine pigment.

The pore volume of the ink-receiving layer is preferably regulated in the range of 0.2 to 2.0 ml/g, preferably 0.6 to 2.0 ml/g. The pore volume of this layer can be regulated in this range by suitably selecting the pore volume of the fine pigment and the amount of the hydrophilic resin. When the pore volume is smaller than 0.2 ml/g, the ink cannot be absorbed unless the amount of the coating is increased and, therefore, the preparation cost of the ink jet recording medium is increased. On the contrary, when the pore volume is larger than 2.0 ml/g, the mechanical strength of the ink-receiving layer is lowered and this layer is easily scarred, peeled or cracked unfavorably. The term “the pore volume” of the ink-receiving layer in the present invention means the total pore volume of pores having a pore diameter of 100 nm or smaller.

The suitable solid content of the aqueous coating used in the present invention, which varies in a wide range depending on the kinds of the fine pigment and the resin used as the main components, is preferably as high as possible so far as the aqueous coating material can be kept stable and applicable. As the concentration of the aqueous coating is increased, the efficiency of the crosslinking reaction performed by the irradiation with electron beam is increased and, in addition, a high gel strength of the coating layer after the gelation can be expected and the drying load can be reduced. When some of the hydrophilic resin, free of the radical-polymerizable unsaturated bond and capable of forming the hydrogel by the irradiation of an aqueous solution thereof with an electron beam are irradiated with electron beam in a water-free state, the disintegration of the resin by breaking the molecular chain thereof will preferentially proceed and the intended crosslinking reaction does not proceed. However, it was confirmed that when the coating liquid contains water in an amount not smaller than that of the hydrophilic resin, the crosslinking reaction preferentially proceeds. The aqueous dispersion of the fine pigment suitably used in the present invention becomes easy to be gelled as the concentration of the dispersion is increased. Accordingly, in practice, the upper limit of the concentration of the aqueous coating is usually determined in view of the stability thereof. Taking the above-described conditions into consideration, the solid concentration of the aqueous coating is preferably 3 to 40% by weight, more preferably 5 to 25% by weight.

The ink-receiving layer may contain additives other than the main components described above so far as the coating property of the aqueous coating is not seriously impaired, the pores necessary for the ink absorption are kept and the water resistance of the ink-receiving layer is not seriously lowered. These additives may be components which do not form the hydrogel even when the aqueous solution thereof is irradiated with electron beam. Examples of the additives include cationic resins used as the ink-fixing agents. The varieties of the cationic resins are not particularly limited. They are, for example, resins comprising a cationic structural unit such as quaternized N,N-dimethylaminoethyl acrylate, quaternized N,N-dimethylaminoethyl methacrylate, quaternized N,N-dimethylaminopropylacrylamide, vinylimidazolium methochloride, cliallyldimethylammonium chloride, monoallylamine hydrochloride or diallylamine hydrochloride. In addition, other cationic resins such as dicyandiamide/polyalkylenepolyamine condensates, secondary amine/epichlorohydrin addition polymers and polyepoxyamines are also usable. Inorganic salts and alumina sol are also usable as the cationic substances.

Further, a defoaming agent can be used as an additive to improve the processability in the coating step; a surfactant can be incorporated for the purpose of improving the wettability of the base material to obtain a uniform ink-receiving layer; and starch or synthetic resin particles can be mixed to prevent the recording medium from the blocking or to improve the paper-passing effect of the printers. In addition, pigments other than that used as the main component can be added for the purpose of controlling the transparency and the surface gloss; and agents for improving the light resistance such as U.V. absorbers and light stabilizers can be added for the purpose of improving the storability of the printed image.

As for methods of adding these additives, they can be previously mixed in the aqueous coating, or the coating layer may be formed and then the solution containing them may be applied by a top coating method, spraying method or impregnation method. When the aqueous coating is gelled by a shock caused by the previous addition of the additives to the coating, it can be effectively dispersed again by a mechanical means. For example, when a cationic resin is added to a dispersion of an anionic pigment such as silica, the coating material is temporarily gelled by the electrostatic properties of them. However, the coating can be made possible after the re-dispersion by a mechanical means. A sufficient water resistance of records or images on the dried coating layer can be kept even when the cationic resin is not particularly crosslinked because both of them are electrostatically firmly bonded together.

Although a single ink-receiving layer obtained by the present invention is enough for exhibiting sufficient surface gloss, image quality and ink-drying property, the layer can also be of a multi-layered construction. The layer of this construction can be prepared by repeating “coating, irradiation with electron beam and drying”. In another method of the preparation, a first layer may be irradiated with electron beam and then a second layer may be formed thereon. In still another method, a second layer can be formed by the coating immediately after forming the first layer and then the layers are irradiated with electron beam. In another method, multiple layers are formed by the coating at once and then they are irradiated with electron beam. Electron beam irradiation can be omitted for layers which do not necessitate the irradiation. When a multi-layer constitution is to be prepared, it is recommended to use the ink-receiving layer of the present invention as the surface layer by utilizing very excellent high performance of the surface thereof.

When multiple layers, formed by an ordinary coating method, are dried at once without using electron beam, the laminar arrangement becomes irregular before the completion of the drying and the coatings in the respective layers are mixed together. As a result, the amount of each coating layer becomes uneven and a harmful influence is exerted on the quality in many cases. Particularly when the viscosity of the coating is low, the coating velocity is low or a large amount of the coating material is applied, the mixing of the layers easily occurs. In order to obtain complete multiple layers under such conditions, it is desirable to repeat coating and drying for the formation of each layer. However, the repetition of the coating and drying cause a low operation efficiency, formation of brokes and increase in the drying load and, as a result, the production efficiency is inevitably lowered. Further, depending on the formulation, the adhesive strength between the layers is apt to be lowered to cause the ply separation. On the contrary, in the present invention, the serious irregulation of the laminar arrangement can be prevented and multiple coating layers having a high interlaminer bonding can be obtained by immediately hydrogelling the coating by the irradiation with electron beam.

Particularly when multiple layers are to be continuously formed with separate heads, it is recommended to form an upper layer after a step of the irradiation of a lower layer with electron beam so that the multiple layers can be stably formed. In this multi-layer coating method wherein the upper layer is formed while the pores in the lower layer are filled with water, a phenomenon that the coating for the upper layer penetrates into the pores in the lower layer to reduce the pore volume in the lower layer does not occur. This method is, therefore, very suitable for a case wherein the coating layer must be porous as in the preparation of the ink jet recording medium of the present invention. On the other hand, in the formation of multiple layers at the same time, the multi-layer coating technique of an accuracy higher than that of the continuous coating with respective heads is possible. Therefore, by irradiating with electron beam immediately after the formation of multiple coatings, the irregulation of the laminar arrangement in the course of the drying can be prevented and the multiple coating layers having a sufficient accuracy can be obtained.

The base materials usable herein include sheets generally used as the base materials of ink jet recording media such as woodfree paper, mechanical paper, coated paper, art paper, cast-coated paper, board, synthetic resin-laminated paper, metallized paper, synthetic paper and white film. However, the base materials are not limited to them. Among them, a base material sheet having a smooth surface and a relatively low liquid-absorption such as the synthetic resin-laminated paper, metallized paper, synthetic paper and white film are preferred because an ink-receiving layer having a very high gloss can be obtained even when the film transfer method or cast coating method is not employed. An ink jet recording medium usable as a light-transmitting recording medium such as a back print or OHP sheet can be prepared by using a plastic film having a high transparency such as polyethylene terephthalate, polyvinyl chloride, polycarbonate, polyimide, cellulose triacetate, cellulose diacetate, polyethylene or polypropylene as the base material. The ink-receiving layer obtained by the present invention is suitable for use as such a medium because of a very high transparency thereof.

When such a base material has an insufficient power of adhering to the ink-receiving layer to be formed on the surface thereof, the adhesive power can be improved by various treatments such as pre-coating and corona discharge treatment.

Taking the paper-passing function of the printer into consideration, the thickness of the base material is preferably 50 to 500 μm.

A single layer can be formed with a known coating device such as a bar coater, roll coater, blade coater, air knife coater, gravure coater, die coater or curtain coater. Of course, other coating devices are also usable.

The multiple layers can be formed with a known coating device such as a slot die coater, slide die coater, curtain coater, knife coater or bar coater. For forming multi-layers at the same time, devices designed for this purpose such as a special multi-layer slot die coater, multi-layer slide die coater and multi-layer curtain coater are preferred. Of course, the devices are not limited to them.

The amount of the coating is preferably about 1 to 60 $g/m^2$, more preferably about 3 to 50 $g/m^2$, after drying. When it is smaller than 1 $g/m^2$, the ink absorption will be insufficient and, on the contrary, when it is larger than 60 $g/m^2$, the resultant recording medium will be easily curled and the cost will be increased unfavorably.

A back layer may be provided on the opposite side to the ink-receiving layer of the base sheet for the purposes of preventing the curling of the sheet and making the transportation thereof in a printer easier. The construction of the back layer and the treatments of the back surface of the base sheet for easy adhesion are not specially limited and they can be suitably selected depending on the use thereof. Taking the coatability and cost into consideration, it is preferred to form the back layer containing a hydrophilic resin as the main component.

For the irradiation of electron beam, scanning method, curtain beam method, broad beam method or the like can be employed in the present invention. The suitable accelerating voltage in the irradiation with electron beam is about 50 to 300 kV, preferably, 100 to 200 kV. The quantity of radiation is preferably controlled in the range of 0.1 to 20 Mrad, particularly, 1 to 10 Mrad. A quantity of less than 0.1 Mrad is insufficient for the gelation of the coating layer and, on the contrary, the radiation of more than 20 Mrad is not preferred because it causes the deterioration and discoloration of the base material and the coating layer.

The hydro-gel layer is then dried. The drying can be carried out by any known ordinary drying methods such as hot air drying and infrared drying. The drying can be carried out at a temperature of 20 to 200° C., preferably 50 to 160° C. The drying time varies depending on the condition of the hydro-gel, the drying temperature, etc. However, the time may be usually between 5 sec. to 30 min., preferably 30 sec. to 10 min.

The ink jet recording medium of the present invention has a very high water resistance. Even when a resin which is essentially soluble in water is used as the binder resin, the resultant ink jet recording medium is scarcely dissolved in water when it is immersed in water because the resin is crosslinked to form a three-dimensional network by the irradiation with electron beam. When the recording medium is used for the printing, the crosslinked resin in the ink-receiving layer is also swollen by the absorption of the ink to increase its volume. However, the swelling velocity is lower than the ink absorption velocity due to the capillary phenomenon in the whole ink-receiving layer. The swelling does not impair the characteristic ink-absorption velocity of the pigment ink-receiving layer.

EXAMPLE

The following Examples will further illustrate the present invention, which by no means limit the scope of the invention. In the Examples, percentages, excluding percentages for haze, are given by weight.

[Method of Determination of Pore Volume in Fine Pigment]

An aqueous dispersion of a fine pigment was dried at 105° C. to obtain a powdery sample. The powdery sample was degassed in vacuo at 200° C. for 2 hours and then determined with a specific surface area/pore distribution determination device (SA 3100 Plus) (a product of Coulter Corporation) according to gas adsorption method. The pore volume was calculated by adsorption isotherm as a total pore volume of pores having a pore diameter of 100 nm or smaller.

[Method of determination of average particle diameter of fine pigment]

100 ml of an aqueous dispersion of a fine pigment was fed in a 500 ml stainless steel cup and then dispersed with T. K. Homodisper (a product of Tokushu Kika Kohgyo K. K.) at 3,000 rpm for 5 minutes to pulverize and to disperse the tertiary particles in the aqueous dispersion. The aqueous dispersion thus treated was sufficiently diluted with distilled water to obtain a sample solution. The average particle diameter was determined by the dynamic light scattering method with a laser granulometer (LPA 3000/3100; a product of Otsuka Denshi K. K.). The average particle diameter was calculated by the analysis by cumulant method.

[Method of Preparing Silica Sol A (Dispersion)]

A synthetic amorphous silica having an average particle diameter of 3 μm (trade name: Nipsil HD-2, primary particle diameter: 11 nm; a product of Nippon Silica Kogyo K. K.) was dispersed in water. After the pulverization and dispersion with a sand grinder, the pulverization and dispersion were repeated until the average particle diameter (average secondary particle diameter) had become 168 nm as determined by the above-described average particle diameter determination method with a hydraulic superhigh pressure homogenizer (microfluidizer M 110-E/H; a product of Mizuho Kohgyo K. K.) to obtain 11% aqueous dispersion. The pore volume of the silica in the aqueous dispersion was 1.2 ml/g as determined by the above-described method. 10 parts of an 11% aqueous solution of diallyldimethylammonium chloride/acrylamide copolymer (trade name: PAS-J-81, a product of Nitto Boseki K. K.) was added as an ink-fixing agent to 100 parts of the above dispersion. The gelled mixture thus obtained was further pulverized and dispersed with the homogenizer to obtain an aqueous silica dispersion having an average particle diameter of 422 nm. The dispersion had a solid concentration of 11%, silica concentration of 10% and diallyldimethylammonium chloride/acrylamide copolymer concentration of 1%. The pore volume of the product determined in the state containing the copolymer was 1.1 ml/g.

[Method of Preparing Silica Sol B (Dispersion)]

An 11% aqueous dispersion of silica having the average primary particle diameter of 7 nm (trade name: AEROSIL 300, a product of Nippon Aerosil K. K.) prepared by the dry method was dispersed three times with the hydraulic super-high pressure homogenizer as used in the preparation of silica sol A. The pore volume of silica in the aqueous dispersion was 1.6 ml/g as determined by the above-described method. The average particle diameter (average secondary particle diameter) was 228 nm. 10 parts of an 11% aqueous solution of diallyldimethylammonium chloride/acrylamide copolymer as used for the preparation of silica sol A was added to 100 parts of the above dispersion. The dispersion by the homogenizer of the resultant, gelled mixture was further repeated to obtain an aqueous dispersion of silica having an average secondary particle diameter of 376 nm. The dispersion had a solid concentration of 11%, silica concentration of 10% and diallyldimethylammonium chloride/acrylamide copolymer concentration of 1%. The pore volume of the product determined in the state containing the copolymer was 1.4 ml/g.

Example 1

100 parts of silica sol A was mixed with 23 parts of a 10% aqueous solution of a partially saponified polyvinyl alcohol (trade name: PVA-420, a product of Kuraray Co., Ltd.) to obtain a coating having a solid concentration of 10.8%. The coating, in an amount of 25 g/m$^2$ (on dry basis), was applied to a transparent polyethylene terephthalate film (Lumirror 100-Q80D, a product of Toray Industries, Inc,) having a thickness of 100 μm used as the base material by the bar coating method. Immediately thereafter, the resultant coating was irradiated with 5 Mrad of electron beam at an accelerating voltage of 175 kV with an electron beam irradiation device (Electro-curtain: a product of ESI). The coating on the surface of the product was in the form of a jelly-like solid after the irradiation. This fact proves that the coating material was in the form of a hydrogel. The product was dried at 100° C. to obtain the ink jet recording medium of the present invention.

The state, 75° gloss, haze and water resistance of the obtained ink-receiving layer of the ink jet recording medium and also the image quality after the printing, ink-drying property and pore volume of the ink-receiving layer were evaluated by the methods described below. The method of forming the ink-receiving layer is shown in Table 1, and the results of the evaluation are shown in Table 2.

Methods of Evaluating Ink Jet Recording Medium

[State of Ink-receiving Layer]

The state of the coating layer of the ink jet recording medium was macroscopically evaluated and classified into the following five criteria:

5: No crack or fissure was caused at all.
4: The Coating layer was partially cracked.
3: The whole coating layer was cracked.
2: The whole coating layer was fissured, and broken pieces were peeled off when the surface was touched.
1: The whole coating layer was fissured, and broken pieces were peeled off in the course of the drying.

[75° Gloss]

75° gloss of the ink jet recording medium was determined according to JIS P 8142.

[Haze]

The haze of the ink jet recording medium prepared with a transparent base material was determined according to JIS K 7105.

[Water Resistance]

An ink jet recording medium cut into pieces of 10 cm×10 cm was immersed in 1 liter of water. One hour after, the ink jet recording medium was taken out, dried with hot air at 100° C. and weighed. The dry weight reduction rate (%) of the ink-receiving layer after the immersion in water was employed as the evaluation standard of the water resistance of the ink-jet recording medium.

[Quality of image]

Two kinds of images of ISO-400 [high definition color digital standard image data ISO/JIS-SCID, p. 13: image name: fruit basket, p. 14: image name: candle (published by a foundation of Japanese Standards Association)] were printed on the ink jet recording medium according to the printing mode of an ink jet printer (PM-700C; a product of EPSON) recommended for superfine paper. The image quality was classified into the following 5 criteria:

5: The ink did not overflow, the boundary between colors was clear, and the solid part was even.

4: The ink did not overflow but the boundary between colors was slightly unclear.

3: The ink did not overflow but the solid part was slightly uneven.

2: The ink overflowed a little.

1: The ink overflowed and the image was broken.

[Ink Drying Property]

The solid printing in cyan, magenta, yellow and black colors was conducted on the ink jet recording medium according to the printing mode of an ink jet printer (PM-700C; a product of EPSON) recommended for a superfine paper. A PPC paper was pressed on the printed part by hand and the ink transfer was macroscopically examined. The time, necessitated until the ink transfer was no longer visible, was measured. The average of the time for each color was calculated and classified into the following 5 criteria:

5: No transfer immediately after the printing

4: Within one minute

3: From 3 minutes to shorter than 5 minutes

2: From 5 minutes to shorter than 10 minutes

1: 10 minutes or longer.

[Method of Determining Pore Volume of Ink-receiving Layer]

The ink-receiving layer was peeled from the base material with a cutter knife to obtain a sample. The sample was degassed in vacuo at 200° C. for 2 hours and the pore volume thereof was determined with a device of determining specific surface area/pore distribution (SA 3100 Plus) (a product of Coulter) according to gas adsorption method. The pore volume was calculated by adsorption isotherm as a total pore volume of pores having a pore diameter of 100 nm or smaller.

Example 2

The ink jet recording medium of the present invention was prepared and then evaluated by the same method as that of Example 1 except that a coating having a solid concentration of 10.8% obtained by mixing 100 parts of silica sol A with 23 parts of a 10% aqueous solution of cationic partially saponified polyvinyl alcohol (trade name: CM-318; a product of Kuraray Co., Ltd.) was used. The method of forming the ink-receiving layer is shown in Table 1, and the results of the evaluation are shown in Table 2.

Example 3

The ink jet recording medium of the present invention was prepared and then evaluated by the same method as that of Example 1 except that a coating having a solid concentration of 10.0% obtained by mixing 100 parts of silica sol A with 33 parts of a 7% aqueous solution of completely saponified polyvinyl alcohol (trade name: PVA-140H; a product of Kuraray Co., Ltd.) was used. The method of forming the ink-receiving layer is shown in Table 1, and the results of the evaluation are shown in Table 2.

Example 4

The ink jet recording medium of the present invention was prepared and then evaluated by the same method as that of Example 1 except that a coating having a solid concentration of 10.8% obtained by mixing 100 parts of silica sol A with 23 parts of a 10% aqueous solution of hydroxypropylmethylcellulose (trade name: Metlose 65SH-50 having a methoxyl group DS of 1.8 and hydroxypropoxyl group MS of 0.15; a product of Shin-Etsu Chemical Co., Ltd.) was used. The method of forming the ink-receiving layer is shown in Table 1, and the results of the evaluation are shown in Table 2.

Example 5

The ink jet recording medium of the present invention was prepared and then evaluated by the same method as that of Example 1 except that a coating having a solid concentration of 10.8% obtained by mixing 100 parts of silica sol A with 23 parts of a 10% aqueous solution of polyethylene oxide (trade name: PEO-1; a product of Sumitomo Seika Chemicals Co., Ltd.) was used. The method of forming the ink-receiving layer is shown in Table 1, and the results of the evaluation are shown in Table 2.

Example 6

The ink jet recording medium of the present invention was prepared and evaluated by the same method as that of Example 1 except that 100 parts of silica sol A was replaced with 100 parts of silica sol B. The method of forming the ink-receiving layer is shown in Table 1, and the results of the evaluation are shown in Table 2.

Example 7

The ink jet recording medium of the present invention was prepared by the same method as that of Example 1 except that a synthetic polyethylene resin laminated paper was used as the base material.

The ink jet recording medium thus obtained was evaluated in the same manner as that of Example 1 except that the haze was not determined. The method of forming the ink-receiving layer is shown in Table 1, and the results of the evaluation are shown in Table 2.

Example 8

The ink jet recording medium of the present invention was prepared and evaluated by the same method as that of Example 1 except that a coating having a solid concentration of 10.7% obtained by mixing 100 parts of silica sol A with 50 parts of a 10% aqueous solution of the partially saponified polyvinyl alcohol as used in Example 1 was used. The method of forming the ink-receiving layer is shown in Table 1, and the results of the evaluation are shown in Table 2.

Comparative Example 1

It was tried to prepare a coating layer by the same method as that of Example 1 except that the coating was immediately dried without the irradiation of electron beam. However, the resultant coating layer was cracked in the course of the drying, and pieces formed by the cracking naturally fell off the base material. Therefore, the evaluation in the same method as that of Example 1 was impossible except that the state of the coating layer was macroscopically observed. The method of forming the ink-receiving layer is shown in Table 1, and the results of the evaluation are shown in Table 2.

Comparative Example 2

It was tried to prepare a coating layer by the same method as that of Example 2 except that the coating layer was immediately dried without the irradiation of electron beam. However, the resultant coating layer was cracked in the course of the drying, and pieces formed by the cracking naturally fell off the base material. Therefore, the evaluation in the same method as that of Example 1 was impossible except that the state of the coating layer was macroscopically observed. The method of forming the ink-receiving layer is shown in Table 1, and the results of the evaluation are shown in Table 2.

Comparative Example 3

It was tried to prepare a coating layer by the same method as that of Example 3 except that the coating layer was immediately dried without the irradiation of electron beam. Although the resultant coating layer was fissured in the course of the drying, pieces were not peeled off the base material and, therefore, the evaluation was conducted in the same method as that of Example 1. The method of forming the ink-receiving layer is shown in Table 1, and the results of the evaluation are shown in Table 2.

Comparative Example 4

It was tried to prepare a coating layer by the same method as that of Example 4 except that the coating layer was immediately dried without the irradiation of electron beam. However, the resultant coating layer was cracked in the course of the drying, and pieces formed by the cracking naturally fell off the base material. Therefore, the evaluation in the same method as that of Example 1 was impossible except that the state of the coating layer was macroscopically observed. The method of forming the ink-receiving layer is shown in Table 1, and the results of the evaluation are shown in Table 2.

Comparative Example 5

It was tried to prepare a coating layer by the same method as that of Example 5 except that the coating layer was immediately dried without the irradiation of electron beam. However, the resultant coating layer was cracked in the course of the drying, and pieces formed by the cracking naturally fell off the base material. Therefore, the evaluation in the same method as that of Example 1 was impossible except that the state of the coating layer was macroscopically observed. The method of forming the ink-receiving layer is shown in Table 1, and the results of the evaluation are shown in Table 2.

Comparative Example 6

It was tried to prepare a coating layer by the same method as that of Example 6 except that the coating layer was immediately dried without the irradiation of electron beam. However, the resultant coating layer was cracked in the course of the drying, and pieces formed by the cracking naturally fell off the base material. Therefore, the evaluation in the same method as that of Example 1 was impossible except that the state of the coating layer was macroscopically observed. The method of forming the ink-receiving layer is shown in Table 1, and the results of the evaluation are shown in Table 2.

Comparative Example 7

It was tried to prepare a coating layer by the same method as that of Example 7 except that the coating layer was immediately dried without the irradiation of electron beam. However, the resultant coating layer was cracked in the course of the drying, and pieces formed by the cracking fell off the base material. Therefore, the evaluation in the same method as that of Example 1 was impossible except that the state of the coating layer was macroscopically observed. The method of forming the ink-receiving layer is shown in Table 1, and the results of the evaluation are shown in Table 2.

Comparative Example 8

It was tried to prepare a coating layer by the same method as that of Example 1 except that the coating layer was immediately dried and then irradiated with electron beam of 5 Mrad at an accelerating voltage of 175 kV. However, such a phenomenon that the resultant coating layer was cracked in the course of the drying, and pieces formed by the cracking naturally fell off the base material was unchanged even by the irradiation of electron beam. Therefore, the evaluation in the same method as that of Example 1 was impossible except that the state of the coating layer was macroscopically observed. The method of forming the ink-receiving layer is shown in Table 1, and the results of the evaluation are shown in Table 2.

Comparative Example 9

A coating layer was prepared and evaluated by the same method as that of Example 1 except that a coating having a solid concentration of 10.3% obtained by mixing 100 parts of silica sol A with 200 parts of a 10% aqueous solution of the partially saponified polyvinyl alcohol as used in Example 1 was used. The method of forming the ink-receiving layer is shown in Table 1, and the results of the evaluation are shown in Table 2.

Comparative Example 10

A coating layer was prepared and evaluated by the same method as that of Example 1 except that a coating having a solid concentration of 10% obtained by mixing 100 parts of colloidal silica (trade name: Snow Tex-O, having a particle diameter of 10 to 20 nm as described in a catalogue; a product of Nissan Chemical Industries, Ltd.) with 100 parts of the 10% aqueous solution of polyethylene oxide as used in Example 5 was used. The average particle diameter of the colloidal silica as determined by the dynamic light scattering method was 54 nm, and the pore volume was 0.22 ml/g. The method of forming the ink-receiving layer is shown in Table 1, and the results of the evaluation are shown in Table 2.

Comparative Example 11

A coating layer was prepared and evaluated by the same method as that of Example 1 except that a coating having a solid concentration of 10.9% obtained by mixing 100 parts of a 10% aqueous dispersion of a fibrous alumina hydrate (trade name: Cataloid AS-3, having a particle size of 100 nm×10 nm as described in a catalogue; a product of Catalysts & Chemicals Industries Co., Ltd.) with 1 part of pentaerythritol tetraacrylate which is an electron beam curable compound (trade name: NK Ester A-TMM-3; a product of Shin-Nakamura Kagaku) was used. The average particle diameter of the alumina hydrate as determined by the dynamic light scattering method was 788 nm, and the pore volume was 0.57 ml/g. The method of forming the ink-receiving layer is shown in Table 1, and the results of the evaluation are shown in Table 2.

Comparative Example 12

A coating layer was prepared and evaluated by the same method as that of Example 1 except that the 10% aqueous solution of partially saponified polyvinyl alcohol as used in Example 1 was used as the coating. The method of forming the ink-receiving layer is shown in Table 1, and the results of the evaluation are shown in Table 2.

Comparative Example 13

It was tried to prepare a coating layer by the same method as that of Example 1 except that a coating having a solid concentration of 10.9% prepared by mixing 100 parts of silica sol A with 1 part of polyethylene glycol diacrylate (trade name: NK Ester A-400, acryloyl equivalent: 254; a product of Shin-Nakamura Kagaku) was used. However, the resultant coating layer was cracked in the course of the drying, and pieces formed by the cracking naturally fell off the base material. Therefore, the evaluation in the same method as that of Example 1 was impossible except that the state of the coating layer was macroscopically observed. The method of forming the ink-receiving layer is shown in Table 1, and the results of the evaluation are shown in Table 2.

TABLE 1

| | Method of forming ink-receiving layer | | | | |
|---|---|---|---|---|---|
| | | | Hydrophilic resin | | Timing of |
| | Base material | Fine pigment | Kind | Amount (pts. by wt.) | electron beam irradiation |
| Ex. 1 | Transparent PET | Silica sol A | Partially saponified PVA | 23 | Before drying |
| Ex. 2 | Transparent PET | Silica sol A | Cationic PVA | 23 | Before drying |
| Ex. 3 | Transparent PET | Silica sol A | Completely saponified PVA | 23 | Before drying |
| Ex. 4 | Transparent PET | Silica sol A | HPMC | 23 | Before drying |
| Ex. 5 | Transparent PET | Silica sol A | PEO | 23 | Before drying |
| Ex. 6 | Transparent PET | Silica sol B | Partially saponified PVA | 23 | Before drying |
| Ex. 7 | Laminated paper | Silica sol A | Partially saponified PVA | 23 | Before drying |
| Ex. 8 | Transparent PET | Silica sol A | Partially saponified PVA | 50 | Before drying |
| Comp. Ex. 1 | Transparent PET | Silica sol A | Partially saponified PVA | 23 | No irradiation |
| Comp. Ex. 2 | Transparent PET | Silica sol A | Cationic PVA | 23 | No irradiation |
| Comp. Ex. 3 | Transparent PET | Silica sol A | Completely saponified PVA | 23 | No irradiation |
| Comp. Ex. 4 | Transparent PET | Silica sol A | HPMC | 23 | No irradiation |

TABLE 1-continued

| | Method of forming ink-receiving layer | | | | |
|---|---|---|---|---|---|
| | | | Hydrophilic resin | | Timing of |
| | Base material | Fine pigment | Kind | Amount (pts. by wt.) | electron beam irradiation |
| Comp. Ex. 5 | Transparent PET | Silica sol A | PEO | 23 | No irradiation |
| Comp. Ex. 6 | Transparent PET | Silica sol B | Partially saponified PVA | 23 | No irradiation |
| Comp. Ex. 7 | Laminated paper | Silica sol A | Partially saponified PVA | 23 | No irradiation |
| Comp. Ex. 8 | Transparent PET | Silica sol A | Partially saponified PVA | 23 | After drying |
| Comp. Ex. 9 | Transparent PET | Silica sol A | Partially saponified PVA | 200 | Before drying |
| Comp. Ex. 10 | Transparent PET | Colloidal silica | PEO | 100 | Before drying |
| Comp. Ex. 11 | Transparent PET | Alumina hydrate | A-TMM-3 | 10 | Before drying |
| Comp. Ex. 12 | Transparent PET | None | Partially saponified PVA | — | Before drying |
| Comp. Ex. 13 | Transparent PET | Silica sol A | A-400 | 10 | Before drying |

TABLE 2

| | Quality | | | | | | |
|---|---|---|---|---|---|---|---|
| | State of ink receiving layer | 75° gloss | Haze (%) | Water resistance (%) | Image quality | Ink-drying property | Pore volume of ink-receiving layer (ml/g) |
| Ex. 1 | 5 | 43.6 | 42.5 | 2 | 5 | 5 | 0.74 |
| Ex. 2 | 5 | 46.6 | 39.7 | 1 | 5 | 5 | 0.75 |
| Ex. 3 | 5 | 46.4 | 47.6 | 1 | 5 | 5 | 0.78 |
| Ex. 4 | 5 | 48.6 | 25.4 | 3 | 5 | 5 | 0.75 |
| Ex. 5 | 5 | 34.5 | 42.8 | 1 | 5 | 5 | 0.73 |
| Ex. 6 | 5 | 103.7 | 11.0 | 2 | 5 | 5 | 0.99 |
| Ex. 7 | 5 | 40.8 | — | 2 | 5 | 5 | 0.74 |
| Ex. 8 | 5 | 38.4 | 57.0 | 1 | 4 | 4 | 0.47 |
| Comp. Ex. 1 | 1 | | | | ND | | |
| Comp. Ex. 2 | 1 | | | | ND | | |
| Comp. Ex. 3 | 2 | 20.3 | 49.4 | 6 | 3 | 3 | 0.62 |
| Comp. Ex. 4 | 1 | | | | ND | | |
| Comp. Ex. 5 | 1 | | | | ND | | |
| Comp. Ex. 6 | 1 | | | | ND | | |
| Comp. Ex. 7 | 1 | ND | — | | | ND | |
| Comp. Ex. 8 | 1 | | | | ND | | |
| Comp. Ex. 9 | 5 | 52.5 | 30.7 | 2 | 2 | 2 | 0 |
| Comp. Ex. 10 | 5 | 150.4 | 4.2 | 2 | 1 | 1 | 0 |
| Comp. Ex. 11 | 3 | 42.3 | 41.2 | 1 | 3 | 3 | 0.43 |
| Comp. Ex. 12 | 5 | 152.2 | 2.9 | 5 | 3 | 2 | 0 |
| Comp. Ex. 13 | 1 | | | | ND | | |

Note:
ND means that the evaluation was impossible.

In Tables 1 and 2, "transparent PET" means a transparent polyethylene terephthalate film, "laminated paper" means synthetic polyethylene resin-laminated paper, "PVA" means polyvinyl alcohol, "HPMC" means hydroxypropylmethylcellulose, "PEO" means polyethylene oxide, "A-TMM-3" means pentaerythritol tetraacrylate, and "A-400" means polyethylene glycol diacrylate. In Table 1, "parts by weight (pts. by wt.)" of the resin is the amount of the solid thereof per 100 parts of the solid content of the pigment. The water resistance value is given in terms of the dry weight reduction rate of the ink-receiving layer. When a synthetic polyethylene resin-laminated paper was used as the base material (Example 7 and Comparative Example 7), the haze was not evaluated because the base material was opaque.

It is clear from the data obtained in Examples 1 to 8 and shown in Table 2, the ink jet recording medium of the present invention has the following advantages: even when a fine pigment which easily causes the cracking was used as the starting material, the obtained coating layer was free from cracking and had a high water resistance due to the crosslinked structure thereof, and even when it was immersed in water, the dry weight reduction rate thereof was very low. The image quality and ink-drying property obtained after the printing with an ink jet printer were very excellent because of the characteristic properties of the ink-receiving layer containing the fine pigment. Particularly when a fine pigment having a small and uniform secondary particle diameter was used as in Example 6, the coating layer having a very high gloss and transparency could be obtained. Also when a synthetic polyethylene resin laminated-paper was used as the base material as in Example 7, the fine pigment particle layer of a high coating weight could be obtained by applying a single layer without any special surface-smoothing treatment.

On the other hand, when the aqueous coating used in any of Examples 1, 2 and 4 to 7 was applied to the base material and directly dried, the resultant coating layer was cracked in the course of the drying and the pieces formed by the cracking naturally peeled off the base material and the intended coating film usable as the ink jet recording medium could not be obtained (Comparative Examples 1, 2 and 4 to 7). Even when the coating was irradiated with electron beam, the appearance of the coating layer was unchanged and the crack-free coating layer could not be obtained (Comparative Example 8). When the aqueous coating used in Example 3 was applied to the base material and immediately dried, cracks which could be macroscopically easily observed were formed on the whole surface of the coating layer, though the pieces formed by the cracking did not naturally peeled probably owing to the very high molecular weight of the completely saponified polyvinyl alcohol used. Such cracks damaged the appearance of the ink jet recording medium and, in addition, the ink diffused along the cracks in the printing step. As a result, the printed image was seriously broken. Further, when the coating film was immersed in water, the coating layer was partially peeled off and dispersed in water (Comparative Example 3). When the amount of the binder resin was larger than that of the pigment, the pores in the pigment was filled with the resin to make the formation of the porous ink-receiving layer impossible, although no problem of the appearance of the coating film was caused. As a result, the ink absorption by the capillary phenomenon did not occur, and the image quality and ink-drying property were seriously damaged (Comparative Example 9). Also when commercially available colloidal silica was used as the pigment and 100 parts of the binder resin was added to 100 parts of colloidal silica, the porous ink-receiving layer could not be formed and the image quality and ink-drying property were seriously damaged (Comparative Example 10). When hydrated alumina was used as the pigment and 10 parts of pentaerythritol tetraacrylate (a compound curable by electron beam) used in place of the binder resin was added to hydrated alumina, the whole coating layer could not be gelled by the irradiation with electron beam because of a low compatibility of the pigment with the compound curable by electron beam. After drying, cracking and peeling were partially observed on the coating layer, and the appearance thereof was unsuitable for the ink jet recording medium. In addition, the image formed by the printing with an ink jet printer was partially blurred probably because of an insufficient curing of the compound curable with electron beam (Comparative Example 11). When the resin layer for receiving the ink was formed without the fine pigment, no pore was formed at all in the ink-receiving layer and the ink-absorption velocity was extremely low to seriously lower the image quality and ink-absorbing property, although the appearance of the ink-receiving layer was good (Comparative Example 12).

When a highly hydrophilic compound curable with electron beam was used as in Comparative Example 13, the coating layer was cracked in the course of the drying because the strength of the gel obtained by the irradiation with electron beam was very low, while no problem was caused on the compatibility thereof with the pigment.

According to the present invention, even when a fine pigment having a large pore volume, which easily cracks in the course of the coating, is used, a crack-free, excellent ink-receiving layer can be formed. Particularly even when 20 $g/m^2$ or more of the coating containing a fine pigment having a pore volume of at least 1.0 ml/g and a minimum amount of a hydrophilic resin is applied at once, a crack-free ink-receiving layer can be obtained. The ink jet recording medium having the ink-receiving layer on the base material has excellent gloss, transparency and water resistance and exhibits high image quality and ink-drying property.

What is claimed is:

1. An ink jet recording medium having at least one coating layer on a base material, wherein at least one of said coating layers comprises a porous ink-receiving layer formed by applying an aqueous coating comprising (a) 100 parts by weight of a fine pigment having an average particle diameter of not larger than 1 $\mu$m and a pore volume of 0.4 to 2.5 ml/g and (b) 1 to 100 parts by weight of a hydrophilic resin free of radical-polymerizable unsaturated bond and capable of forming a hydrogel by the irradiation of an aqueous solution thereof with electron beam, irradiating the resultant coating with electron beam to convert it into a hydro-gel and then drying the resultant coating.

2. The ink jet recording medium according to claim 1, wherein said fine pigment has an average particle diameter of 8 to 800 nm.

3. The ink jet recording medium according to claim 1, wherein said fine pigment has an average particle diameter of 9 to 700 nm.

4. The ink jet recording medium according to claim 1, wherein said fine pigment has a pore volume of 0.4 to 2.0 ml/g.

5. The ink jet recording medium according to claim 1, wherein said fine pigment has a pore volume of 0.6 to 1.9 ml/g.

6. The ink jet recording medium according to claim 1, wherein said hydrophilic resin is used in an amount of 3 to 30 parts by weight per 100 parts by weight of said pigment in the aqueous coating.

7. The ink jet recording medium according to claim 1, wherein the dry weight reduction rate of said ink-receiving layer after immersion in water for one hour is not higher than 10%.

8. The ink jet recording medium of claim 1, wherein said hydrophilic resin is selected from the group consisting of completely saponified or partially saponified polyvinyl alcohol, polyethylene oxide, polyalkylene oxides, polyvinylpyrrolidone, water-soluble polyvinylacetal, poly-N-vinylacetamide, polyacrylamide, polyacryloylmorpholine, polyhydroxyalkyl acrylates, polyacrylic acid, hydroxyethylcellulose, methylcellulose, hydroxypropylmethylcellulose, hydroxypropylcellulose, gelatin, casein, water-soluble derivatives of them and copolymers of them.

9. The ink jet recording medium of claim 8, wherein said water-soluble derivative is a cationic derivative selected from the group consisting of cationic completely saponified or partially saponified polyvinyl alcohol, cationic polyvinylpyrrolidone, cationic water-soluble polyvinyl acetal, cationic poly-N-vinylacetamide, cationic polyacrylamide, cationic polyacryloylmorpholine, cationic polyhydroxyalkyl acrylates, cationic hydroxyethylcellulose, cationic methylcellulose, cationic hydroxypropylmethylcellulose, cationic hydroxypropylcellulose, cationic gelatin and cationic casein.

10. The ink jet recording medium of claim 1, wherein said fine pigment is selected from the group consisting of silica, aluminum hydroxide, boehmite, pseudo-boehmite and alumina.

11. The ink jet recording medium of claim 1, wherein said fine pigment particles are secondary particles having an average diameter of 8 to 800 nm, wherein primary particles having an average diameter of 3 to 40 nm are aggregated.

12. An ink jet recording medium having at least one coating layer on a base material, wherein at least one of said coating layers comprises a porous ink-receiving layer having a pore volume of 0.2 to 2.0 ml/g, said coating layer being formed by applying an aqueous coating comprising (c) 100 parts by weight of a fine pigment selected from the group consisting of silica and alumina and having an average particle diameter of not larger than 1 $\mu$m and a pore volume of 0.6 to 1.9 ml/g, and (d) 1 to 100 parts by weight of a hydrophilic resin free of radical-polymerizable unsaturated bond and capable of forming a hydrogel by the irradiation of an aqueous solution thereof with electron beam, irradiating the resultant coating with electron beam to convert it into a hydrogel and then drying the resultant coating.

13. The ink jet recording medium according to claim 12, wherein said fine pigment has an averages particle diameter of 8 to 800 nm.

14. The ink jet recording medium according to claim 12, wherein said hydrophilic resin is used in an amount of 3 to 30 parts by weight per 100 parts by weight of said pigment in the aqueous coating.

15. The ink jet recording medium according to claim 12, wherein the dry weight reduction rate of said ink-receiving layer after immersion in water for one hour is not higher than 10%.

16. The ink jet recording medium of claim 12, wherein said hydrophilic resin is selected from the group consisting of completely saponified or partially saponified polyvinyl alcohol, polyethylene oxide, polyalkylene oxides, polyvinylpyrrolidone, water-soluble polyvinylacetal, poly-N-vinylacetamide, polyacrylamide, polyacryloylmorpholine, polyhydroxyalkyl acrylates, polyacrylic acid, hydroxyethylcellulose, methylcellulose, hydroxypropylmethylcellulose, hydroxypropylcellulose, gelatin, casein, water-soluble derivatives of them and copolymers of them.

17. The ink jet recording medium of claim 16, wherein said water-soluble derivative is a cationic derivative selected from the group consisting of cationic completely saponified or partially saponified polyvinyl alcohol, cationic polyvinylpyrrolidone, cationic water-soluble polyvinyl acetal, cationic poly-N-vinylacetamide, cationic polyacrylamide, cationic polyacryloylmorpholine, cationic polyhydroxyalkyl acrylates, cationic hydroxyethylcellulose, cationic methylcellulose, cationic hydroxypropylmethylcellulose, cationic hydroxypropylcellulose, cationic gelatin and cationic casein.

18. The ink jet recording medium of claim 12, wherein said ink-receiving layer has a pore volume of 0.6 to 2.0 ml/g.

19. The ink jet recording medium of claim 12, wherein said fine pigment particles are secondary particles having an average diameter of 8 to 800 nm, wherein primary particles having an average diameter of 3 to 40 nm are aggregated.

* * * * *